United States Patent
Mahadik et al.

(10) Patent No.: US 12,294,529 B2
(45) Date of Patent: May 6, 2025

(54) TRANSFERABLE CLUSTERING OF CONTEXTUAL BANDITS FOR CLOUD SERVICE RESOURCE ALLOCATION

(71) Applicant: ADOBE INC., San Jose, CA (US)

(72) Inventors: Kanak Mahadik, San Jose, CA (US); Tong Yu, San Jose, CA (US); Junda Wu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/342,516

(22) Filed: Jun. 27, 2023

(65) Prior Publication Data

US 2025/0007858 A1  Jan. 2, 2025

(51) Int. Cl.
*H04L 41/16* (2022.01)
*H04L 47/78* (2022.01)

(52) U.S. Cl.
CPC ............ *H04L 47/781* (2013.01); *H04L 41/16* (2013.01)

(58) Field of Classification Search
CPC .............................. H04L 47/781; H04L 41/16
See application file for complete search history.

(56) References Cited

U.S. PATENT DOCUMENTS

| | | | | |
|---|---|---|---|---|
| 10,089,575 | B1 * | 10/2018 | Redmon | G06N 3/08 |
| 10,877,863 | B2 * | 12/2020 | Choi | G06N 7/01 |
| 11,776,542 | B1 * | 10/2023 | Bueche | G10L 15/1822 |
| | | | | 704/231 |
| 12,106,180 | B2 * | 10/2024 | Nelson | G06Q 10/103 |
| 2010/0121850 | A1 * | 5/2010 | Moitra | G06F 16/95 |
| | | | | 707/E17.107 |
| 2018/0018590 | A1 * | 1/2018 | Szeto | G16H 50/20 |
| 2019/0242608 | A1 * | 8/2019 | Laftchiev | G05B 13/048 |
| 2019/0370927 | A1 * | 12/2019 | Frenkel | G06F 9/453 |
| 2020/0150622 | A1 * | 5/2020 | Cai | G05B 23/024 |
| 2021/0191759 | A1 * | 6/2021 | Fong | G06F 9/4881 |
| 2021/0357255 | A1 * | 11/2021 | Mahadik | G06F 11/3006 |
| 2022/0114225 | A1 * | 4/2022 | Murugesan | G06N 7/01 |
| 2023/0032853 | A1 * | 2/2023 | Mahadik | G06F 9/5077 |
| 2023/0195723 | A1 * | 6/2023 | Kaku | G06F 16/242 |
| | | | | 707/769 |
| 2024/0320513 | A1 * | 9/2024 | Sun | G06N 3/098 |

OTHER PUBLICATIONS

Abdelbaky, M., et al., "Docker containers across multiple clouds and data centers", In 2015 IEEE/ACM 8th International Conference on Utility and Cloud computing (UCC), pp. 1-4 (Dec. 2015).

(Continued)

*Primary Examiner* — Dhairya A Patel
(74) *Attorney, Agent, or Firm* — Shook, Hardy & Bacon L.L.P.

(57) ABSTRACT

Methods for determining optimal cloud service resource include determining a reward function for a set of resource configurations identifying cloud service resource parameters. The cloud service resource parameters include a source parameter and a target parameter of services to provide a client computing device. A source parameter dataset for the source parameter and a target parameter dataset is generated using the reward function and historical source parameter data. The matrices are then subject to SVD and clustering. A target parameter reward dataset is learned from output of the SVD and clustering. The target parameter dataset is used to determine the parameters for the target parameter for providing corresponding cloud service resources.

20 Claims, 7 Drawing Sheets

(56) References Cited

OTHER PUBLICATIONS

Auer, P., et al., "The non-stochastic multi-armed bandit problem", SIAM journal on computing, vol. 32, No. 1, pp. 1-33 (2002).
Burns, B., et al., "Borg, Omega, and Kubernetes: Lessons learned from three container-management systems over a decade", ACM Queue, vol. 14, No. (1), pp. 1-24 (2016).
Calheiros, R. N., et al., "Workload prediction using ARIMA model and its impact on cloud applications' QoS", IEEE transactions on cloud computing, vol. 3, No. 4, pp. 1-11 (2014).
Burns, B., et al., "Kubernetes: up and running: dive into the future of infrastructure", O'Reilly Media, Inc., pp. 1-277 (2017).
Hindman, B., et al., "Mesos: A platform for fine-grained resource sharing in the data center", In NSDI'11: Proceedings of the 8th USENIX conference on Networked systems design and implementation, vol. 11, pp. 1-14 (Mar. 2011).
Lattimore, T., and Szepesvari, C., "Bandit algorithms", Cambridge University Press, pp. 1-596 (2020).
Lorido-Botran, T., et al., "A review of auto-scaling techniques for elastic applications in cloud environments", Journal of Grid Computing, vol. 12, No. 4, pp. 1-26 (2014).
Mauro, T., "Adopting microservices at netflix: Lessons for architectural design", DZone Integration, published on Apr. 7, 2015, Retrieved from Internet URL: https://dzone.com/articles/adopting-microservices-netflix, accessed on Jun. 25, 2021, pp. 1-8.
Park, Y., et al., "Linear quadratic regulator for resource-efficient cloud services", In Proceedings of the ACM Symposium on Cloud Computing, p. 1 (Nov. 2019).
White, J.M., "Bandit algorithms for website optimization", O'Reilly Media, Inc., pp. 1-87 (2012).
Auer, P., et al., "Finite-time analysis of the multiarmed bandit problem", Machine Learning, vol. 47, pp. 235-256 (2002).
Russo, D. J., et al., "A tutorial on thompson sampling", Foundations and Trends® in Machine Learning, vol. 11, No. 1, pp. 1-39 (2018).
Sutton, R. S., and Barto, A.G., "Reinforcement learning: An introduction", MIT press, pp. 1-398 (2018).
Rossi, F., et al., "Horizontal and vertical scaling of container-based applications using reinforcement learning," in 2019 IEEE 12th International Conference on Cloud Computing (CLOUD), pp. 329-338 (2019).
Tesauro, G., et al., "A hybrid reinforcement learning approach to autonomic resource allocation," in 2006 IEEE International Conference on Autonomic Computing, pp. 1-9 (2006).
Delande, D., et al., "Horizontal scaling in cloud using contextual bandits", in European Conference on Parallel Processing, Springer, pp. 285-300 (2021).
Lu, T., et al., "Contextual multi-armed bandits," Appearing in Proceedings of the Thirteenth international conference on Artificial Intelligence and Statistics, pp. 485-492 (2010).
Li, L., et al., "A contextual-bandit approach to personalized news article recommendation", in Proceedings of the 19th international conference on World wide web, pp. 1-10 (2010).
Li, S., et al., "Improved algorithm on online clustering of bandits", in Proceedings of the 28th International Joint Conference on Artificial Intelligence, pp. 1-13 (2019).
Gentile, C., et al., "Online clustering of bandits", Proceedings of the 31st International Conference on Machine Learning, PMLR, pp. 1-9 (2014).
Gentile, C., et al., "On context-dependent clustering of bandits", Proceedings of the 34th International Conference on Machine Learning, ICML, pp. 1-10 (2017).
Nguyen, T.T., and Lauw, H.W., "Dynamic clustering of contextual multi-armed bandits", in Proceedings of the 23rd ACM International Conference on Conference on Information and Knowledge Management, pp. 1-5 (2014).
Zhu, J-Y., et al., "Unpaired image-to-image translation using cycle-consistent adversarial networks", in Proceedings of the IEEE international conference on computer vision (ICCV), pp. 2223-2232 (2017).
Ganin, Y., et al., "Domain-adversarial training of neural networks", The journal of machine learning research, vol. 17, No. 1, pp. 1-35 (2016).
Eysenbach, B., et al., "Off-dynamics reinforcement learning: Training for transfer with domain classifiers", arXiv preprint arXiv:2006.13916v1, pp. 1-20 (Jun. 24, 2020).
Wu, J., et al., "Dynamics-aware adaptation for reinforcement learning based cross-domain interactive recommendation", in Proceedings of the 45th International ACM SIGIR Conference on Research and Development in Information Retrieval, pp. 1-11 (2022).
Liu, B., et al., "Transferable contextual bandit for cross-domain recommendation", in Proceedings of the AAAI Conference on Artificial Intelligence, vol. 32, pp. 3619-3626 (2018).
Lloyd, S.P., "Least squares quantization in PCM", IEEE transactions on information theory, vol. 28, No. 2, pp. 129-137 (1982).
Harper, F.M., and Konstan, J.A., "The movielens datasets: History and context", ACM Transactions on Interactive Intelligent Systems (TIIS), vol. 5, No. 4, pp. 1-20 (2015).
Tong Yu, et al., U.S. Appl. No. 18/120,088, filed Mar. 10, 2023, title "Resource Provisioning by a Reinforcement Learning Framework Using Guided Ordering of Services".
Kanak Vivek Mahadik, et al., U.S. Appl. No. 17/749,577, filed May 20, 2022, title "Efficient Adaptive Allocation of Resoures for Computational Systems via Statistically Derived Linear Models".

* cited by examiner

TRANSFERABLE CLUSTERING OF CONTEXTUAL BANDITS FOR CLOUD SERVICE RESOURCE ALLOCATION

BACKGROUND

Resource allocation for cloud service resources involves assigning the right amount of central processing unit (CPU), graphic processing unit (GPU), and memory resources for the service and scaling parameters such that it meets required demands.

SUMMARY

Cloud service resources are provided from a cloud service server to a client computing device. To determine the optimal resource parameters, a set of resource configurations for the client that includes a source parameter (such as the amount of CPU) and a target parameter (such as the amount of GPU) are used to determine a reward function.

The reward function describes the resource parameters, such as the source parameter and the target parameter, for the client over each resource configuration in the set of resource configurations.

Matrices for the source parameter and target parameter can be determined using the reward function and historical source parameter data, which is more readily available than data corresponding to the target parameter.

To determine the optimal target parameter (e.g., the optimal number of cloud service resources to offer to the client device), information can be learned from the source parameter. The source parameter matrix and the target parameter matrix are subject to a machine learning technique and then to a clustering technique. From the output of these, a target parameter reward dataset can be learned and used to identify an optimal resource configuration. The optimal resource configuration includes the optimal target parameter for providing cloud service resources corresponding to it.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
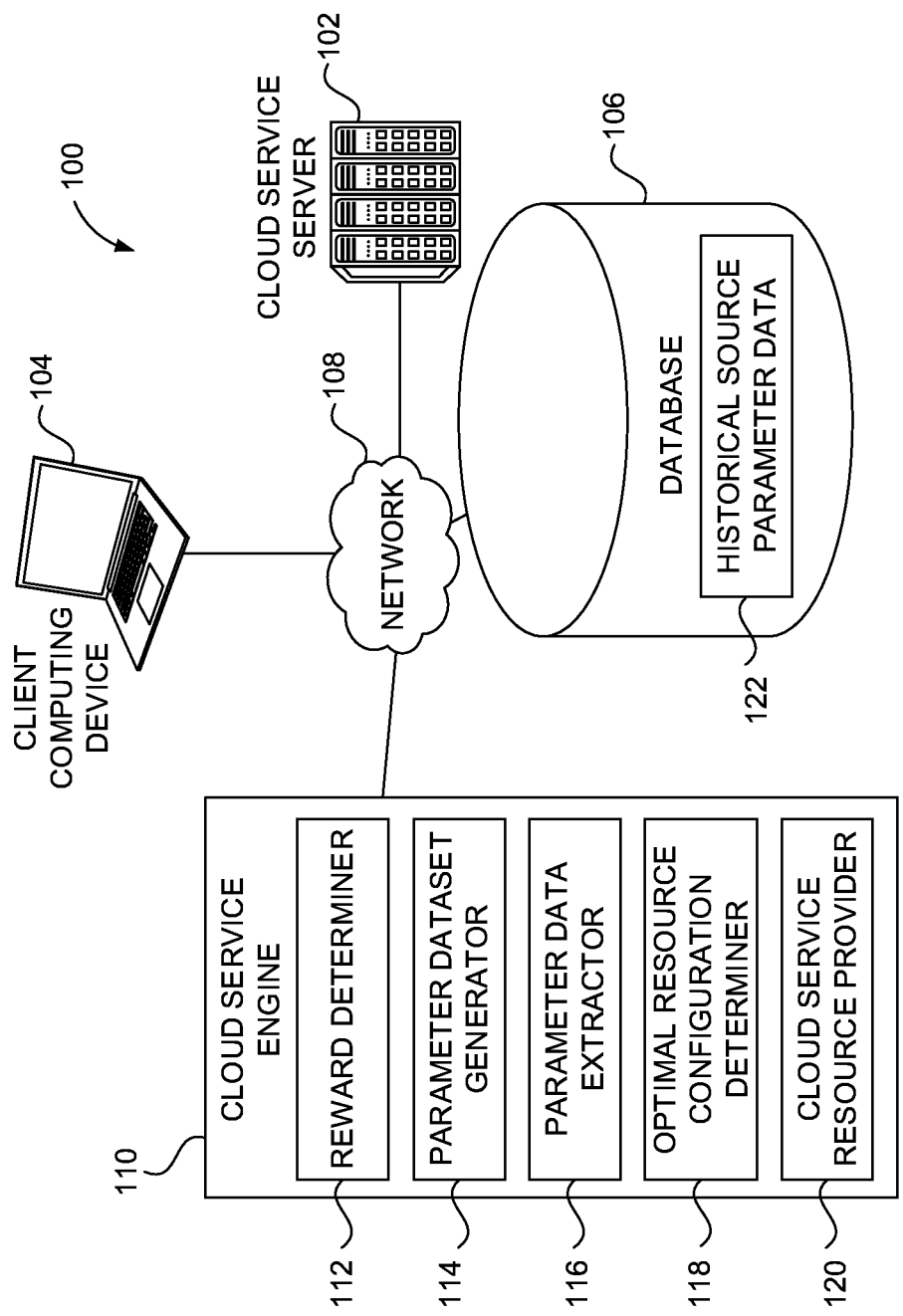
FIG. 1 illustrates an example operating environment in which aspects of the technology can be employed, in accordance with an aspect descried herein.

Resource allocation for cloud service resources is challenging. It involves assigning the right amount of CPU, GPU, memory, and other like resources for the service and scaling resource parameters such that a cloud service resource provider provides resources in ways that reduces computational waste. In addition, the load on the service provider is not static; it changes. In order to meet peak demand, often clients are assigned a higher amount of resources, leading to over-provisioning and resource wastage. In the past, to assign resources according to demand, it has been necessary to setup extensive experiments on the cloud instances and learn resource allocation through experimentation.

One such resource parameter is GPU. GPU instances are extremely costly due to their high computational requirements. For example, the popular and highly in-demand A100 instances can cost upwards of $32 for only one hour with some service providers. Hence, offline data collection for these high-priced instances is extremely limited, since experimentation on these instances is computationally intensive. Without experimentation, resources are overprovisioned on these instances leading to wastage of computational resources.

Previous methods addressing these issues use reinforcement learning (RL)-based approaches. These require huge amount of samples to learn and thus often lack stability and interpretability of policy. Further, RL-based methods may not be possible due to the lack of offline data that is collected for some resources. Bandit-based strategies have been proposed to overcome challenges of such approaches. In practice, some bandit-based solutions are sample-inefficient and are constrained by the number of interactions. Larger interactions translate to high exploration costs for GPU instances due to the rich feedback required to obtain a well-trained bandit model. Hence, the bandit faces cold-start issues that may generate an inaccurate model.

To address this problem of resource allocation for services that run on GPU instances, or other costly and computationally expensive cloud service resource resources, the technology applies a transfer learning-based approach by learning from historical CPU instances, of which data is readily available, and transferrin that learning to determine optimal GPU usage.

One such example method that achieves this learning benefit includes formulating the cross-domain resource allocation problem (such as CPU to GPU) as an online contextual bandit problem. The technology uses a transferable clustering of bandits algorithm to learn a translation matrix between the clustering representations on the source domain (e.g., CPU instances) and the clustering representations on the target domain (e.g., GPU instances). The method, when evaluated on two datasets, shows the improved performances in terms of the accumulative reward metric.

In contextual multi-armed bandit problems, a fixed set of arms are predefined and the goal is to find the optimal arm with the highest reward. These arms include a resource configuration that defines resource parameters, such as a number of resources to be allocated to a computing device. Different from the traditional multi-armed bandit setting, the arms are represented as context vectors. In the online decision-making process, the trade-off between exploration and exploitation is balanced typically using Upper Confidence Bound (UCB) algorithms. If the uncertainty is relatively high, the algorithm tends to explore more arms, while if the uncertainty is reduced, the algorithm is more confident that the current predicted arm has the highest reward.

In the clustering of bandits problems, a group of bandits are involved in the online decision making process. In applications like recommender systems, the users are assumed to share some preferences on the items due to social interactions. Thus, new users can be clustered with some existing users to get more accurate recommendations, which helps to solve the so-called cold-start problem.

In transfer learning problems, multiple domains are assumed to have different feature representation spaces (e.g., the CPU domain versus the GPU domain). To utilize data from a rich source domain to enhance the model performance in those relatively more sparse domains, some works try to learn the feature translation between domains. Others consider the translation of dynamics. In linear contextual bandit applications, since bandit representations and arm context are aligned in an inner-product space, some methods have sought to develop the transferable contextual bandit algorithm to translate user preferences by learning the item context translation matrix.

One example uses LinUCB (Linear UCB). The LinUCB algorithm simply conducts online ridge-regression and promotes exploration based on the estimated uncertainty bound.

Another uses SCLUB (set-based clustering of bandits). The SCLUB algorithm conducts online clustering of bandits algorithm to accelerate the learning through collaborative exploration and exploitation of the group preferences.

Yet another uses k-means. The k-means algorithm is another clustering of bandits method based on a k-means clustering algorithm.

To achieve these benefits, one example of the technology is provided. The method uses readily available data of a source domain to learn a dataset within the target domain, from which a cloud based resource parameter can be determined, and the corresponding cloud based resource be provided to a client computing device. In an aspect of the technology, the source domain relates to CPU, while the target domain relates to GPU. Thus, a dataset from the CPU domain, which is readily available, can be used to learn a dataset in the target domain, of which there may be no robust equivalent due to the computational cost of learning target domain data by experimentation. The target domain data can then be used to determine a target parameter, e.g., an amount of a cloud service resource to allocate or otherwise make available to a client computing device.

To do so, a reward function is generated or is otherwise accessed. The reward function describes the reward for a set of resource configurations across a client. The resource configurations indicate the parameters of cloud service resources that may be provided to a client. For instance, one resource configuration may identify the parameters for various possible resources, such as the amount of CPU, GPU, memory, and the like, that is allocated or otherwise provided to the client computing device. These can include a source parameter, for which historical data is known, and a target parameter, for which the technology seeks to optimize and provide to the client device. Since there are various combinations of these configurations, there is a plurality of resource configurations in the set.

Using the reward function and the historical source parameter data, a source parameter dataset and a target parameter dataset can be generated. In an aspect, the source parameter dataset is a source parameter matrix in the source domain and the target parameter dataset is a target parameter matrix in the target domain. As an example, a source parameter vector for each of the resource configurations in the set of resource configurations is determined via the reward function and stacked to form the source parameter matrix. A target parameter vector for each of the resource configurations is also determined via the reward function and stacked to form the target parameter matrix. To learn from these datasets, a machine learning technique, such as SVD (singular value decomposition), can be performed on the datasets.

The output of the machine learning can be clustered using k-means to generate clustering centroids that are used as source domain clustering representations. Using the extracted datasets and the clustering centroids, a target parameter reward dataset is determined, which is then used to determine the target parameter, e.g., the parameter that was sought to be determined using the source parameter, thus transferring knowledge from the source domain to the target domain.

Having identified the target parameter, cloud service resources can be offered to the client computing device corresponding to the target parameter. As an example, if the target parameter were determined to be 3 GPU, the 3 GPU can be provided or otherwise allocated to the client computing device. As noted, by using this learned knowledge, the target parameter can be calculated, as opposed to determined through computationally intensive experiments.

The method previously described is only an example that can be practiced from the description that follows, and it is provided to more easily understand the technology and recognize its benefits. Additional examples are now described with reference to the figures.

With reference now to FIG. 1, an example operating environment 100 in which aspects of the technology may be employed is provided. Among other components or engines not shown, operating environment 100 comprises cloud service server 102, client computing device 104, and database 106, which are communicating via network 108.

Database 106 generally stores information, including data, computer instructions (e.g., software program instructions, routines, or services), or models used in embodiments of the described technologies. Although depicted as a single database component, database 106 may be embodied as one or more databases or may be in the cloud.

Network 108 may include one or more networks (e.g., public network or virtual private network (VPN)) as shown with network 108. Network 108 may include, without limitation, one or more local area networks (LANs) wide area networks (WANs), or any other communication network or method.

Generally, cloud service server 102 is a computing device that implements functional aspects of operating environment 100, such as one or more functions of cloud service engine 110 to allocate cloud service resources, such as CPU, GPU, memory, and so forth to client computing device 104. One suitable example of a computing device that can be employed as cloud service server 102 is described as computing device 700 with respect to FIG. 7. In implementations, cloud service server 102 represents a back-end or server-side device.

Client computing device 104 is generally a computing device that may use cloud service resources. As with other components of FIG. 1, client computing device 104 is intended to represent one or more computing devices. One suitable example of a computing device that can be employed as client computing device 104 is described as computing device 700 with respect to FIG. 7. In implementations, client computing device 104 is a client-side or front-end device. In addition to cloud service server 102, client computing device 104 may implement functional aspects of operating environment 100, such as one or more functions of cloud service engine 110. It will be understood that some implementations of the technology will comprise either a client-side or front-end computing device, a back-end or server-side computing device, or both executing any combination of functions from cloud service engine 110, among other functions.

Cloud service engine 110 generally determines one or more cloud service parameters corresponding to cloud service resources. For instance, cloud service engine 110 determines an amount (the parameter) of cloud service resources to provide (e.g., to allocate) to client computing device 104. In doing so, cloud service engine 110 employs reward determiner 112, parameter dataset generator 114, parameter data extractor 116, optimal resource configuration determiner 118, and cloud service resource provider 120.

Reward determiner 112 is generally employed to determine a reward function for a set of resource configurations corresponding to a client. As noted, the set of resource configurations may comprise a plurality of resource configurations identifying cloud service resource parameters for providing cloud service resources to a client computing device associated with the client. The reward function describes the cloud service resources across the set of resource configurations.

Figure 2:
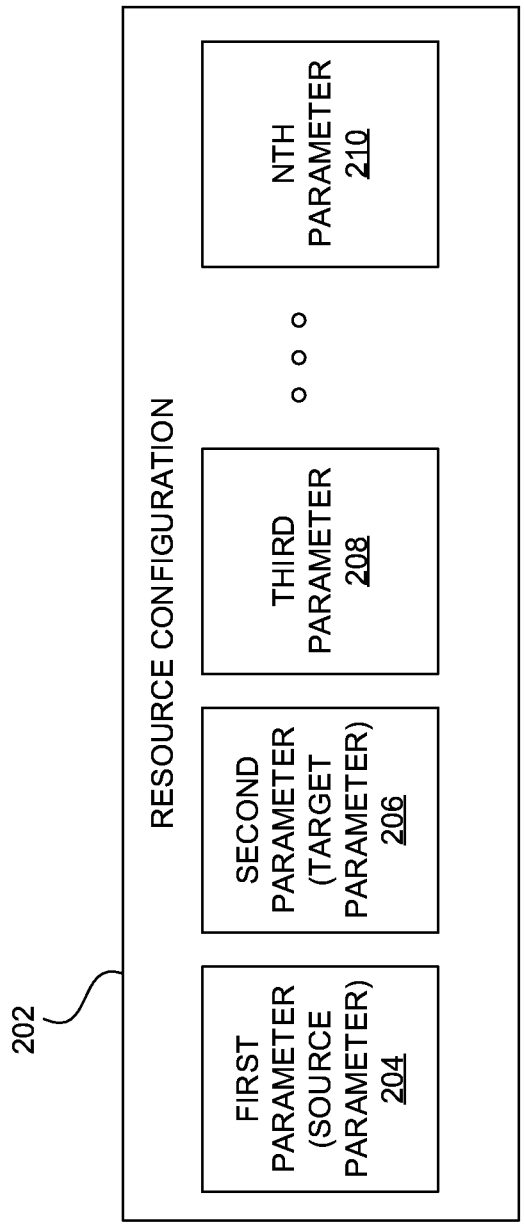
FIG. 2 illustrates an example resource configuration usable by components of FIG. 1, in accordance with an aspect described herein.

Briefly, FIG. 2 provides an example block diagram illustrating resource configuration 202. Resource configuration 202 is an example suitable for use by components of FIG. 1. As illustrated, resource configuration 202 comprises a plurality of parameters that correspond to cloud service resources that may be offered by cloud service server 102. As represented by FIG. 2, resource configuration 202 may identify any number of parameters, illustrated here as first parameter (source parameter) 204, second parameter (target parameter) 206, and third parameter 208 through Nth parameter 210. In some aspects, one or more parameters may comprise a source parameter or a target parameter, illustrated in FIG. 2 as resource configuration 202 comprising first parameter (source parameter) 204 and second parameter (target parameter) 206.

Cloud service parameters may include any cloud service provided by cloud service server 102. Examples include CPU, GPU, TPU (tensor processing unit), FPGA (field programmable gate arrays), and other like services. In general, any of the cloud services may act as a source parameter for learning a target parameter. However, throughout this disclosure, reference is generally made in the context of CPU being the source domain and GPU being the target domain, as GPU data for learning the optimal GPU allocation is relatively scarce compared to the CPU data, and as such, it is beneficial to learn the GPU as a target parameter from the CPU domain.

As noted, reward determiner 112 may determine the reward function for a set of resource configurations. The set of configurations includes a plurality of resource configurations that may be provided to a client computing device. For example, a resource configuration may include 4 CPU and 2 GPU, while another may include 4 CPU and 3 GPU, and so forth over any combination of cloud service resource parameters for any cloud service resources.

Figure 3:
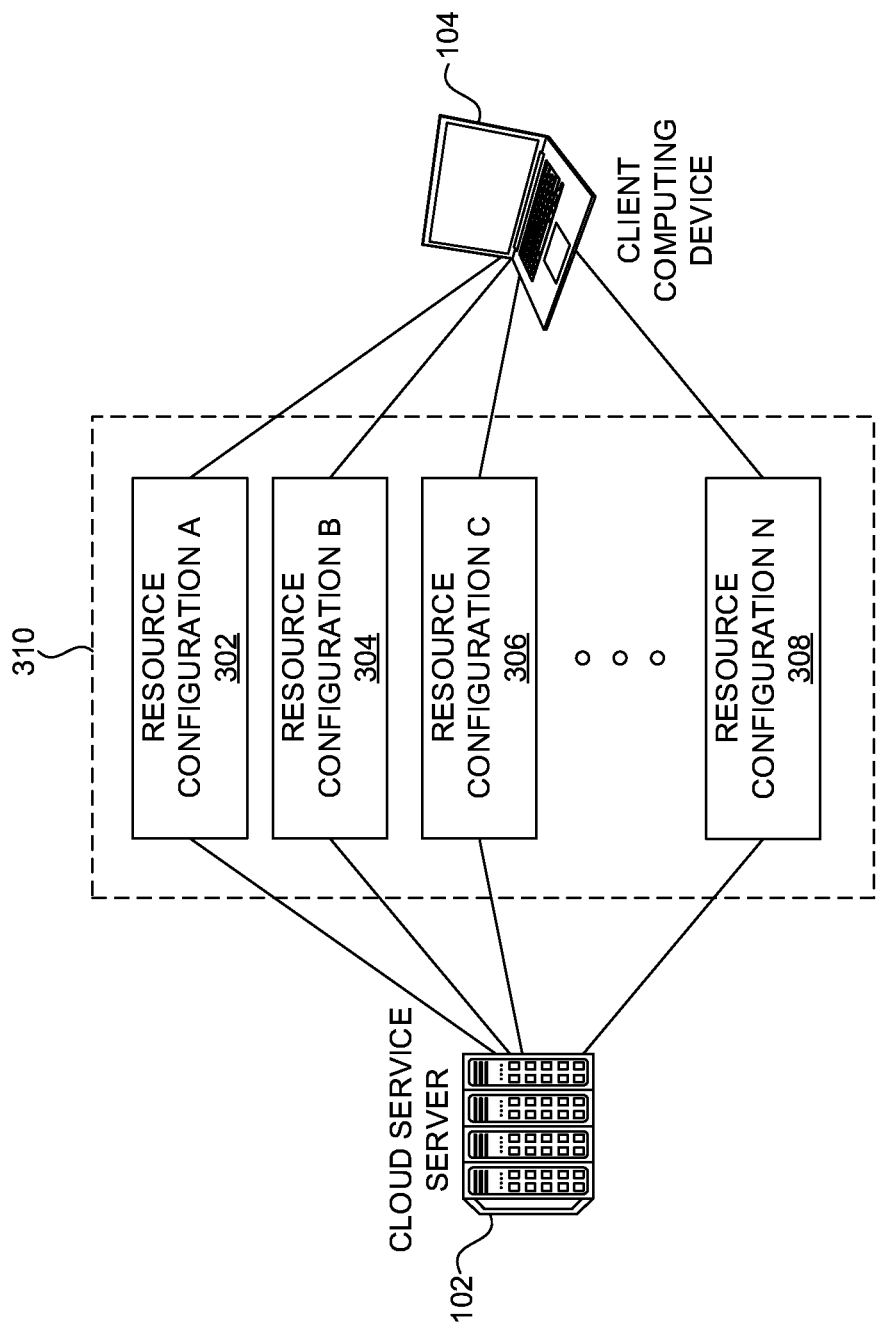
FIG. 3 illustrates an example set of resource configurations that can be provided and used by components of FIG. 1, in accordance with an aspect described herein.

FIG. 3 illustrates an example. Here, cloud service server 102 offers any resource configuration, such as resource configuration A 302, resource configuration B 304, and resource configuration C 306, through resource configuration N 308, which are included in set of resource configurations 310, to client computing device 104. Any number resource configurations may be included in the set.

As an example, a resource configuration tuple can comprise the following parameters: (1) CPUs (c): the number of CPUs required within each container for CPU-based services; (2) GPUs (g): the number of GPUs required within each container for CPU-based services; (3) high watermarks (hw) and low watermarks (lw), for CPU utilization what % (percentage) CPU utilization triggers a scale-up or scale-down event; (4) Minimum number of containers deployed for a service (mi); and (5) Maximum number of containers deployed for a service (mx).

Each tuple of CPUs, low watermark, high watermark, is a choice and is modeled as an arm. That is, each arm is represented as a feature vector $\in {}^{1 \times D}$, where D=5. As noted, a resource configuration tuple may also include other parameters such as memory, scaling factors, and so forth. In these cases, D will be larger.

The reward function is extracted by modeling the utility in terms of utilization, overheads, and performance penalties for the services. The reward is encoded as a sum of these terms, namely, resource wastage (to estimate utilization), penalty when the service does not meet required performance constraints (e.g., RPM, latency), and number of times the service undergoes scaling based on its usage and configuration. The resource wastage is the difference between total allocated CPUs and total used CPUs for a service. Number of scalings refers to the count of scaling events associated with scaling the service up (adding containers) or down (reducing containers) when the service hits the scaling thresholds. There is a penalty when the service does not meet the required performance. There is a desire to reduce this overall sum of the resource wastage, performance penalty, and the number of scalings made by the cluster manager on behalf of the service during a given interval. In addition, the reward function may be linear in terms of the above designed feature vector. Hence, the reward function can be the negative weighted sum of these factors.

The following equation represents a simplified example of a reward function generated by reward determiner 112. The reward function is scaled between 0 and 1.

$$f(t) = 1 - (w_{perf} * \widetilde{p(t)} + w_{waste} * \widetilde{w(t)} + w_{overhead} * \widetilde{s(t)}) \quad (1)$$

Here, $\widetilde{w(t)}$ represents normalized difference between allocated and used CPUs, and $\widetilde{s(t)}$ represents normalized scaling.

Parameter dataset generator 114 uses the reward function generated by reward determiner 112 to generate the source parameter dataset. To generate the source parameter dataset, parameter dataset generator 114 can access historical source parameter data 122 and input this to the reward function. As an example, historical source parameter data 122 may comprises historical resource usage over time for one or more client devices. As an example, historical source parameter data 122 may comprise historical CPU usage rates by one or more client computing devices.

The source parameter dataset may comprise feature vectors or pseudo service feature vectors generated by the reward function for the historical source parameter data 122. This may be in the form of a source parameter matrix that is generated from the vectors by stacking the vectors generated by the reward function. That is, a vector and pseudo service feature vector may be generated for each of the configurations. Thus, if there are 100 resource configurations, the then number of stacked vectors can be 100. A matrix in the target domain, e.g., a target parameter matrix, may also be generated using the historical source parameter data 122 as input to the reward function. The target parameter matrix may comprise target parameter vectors. The target source parameter vectors are determined using the reward function for each of the resource configurations in the set of resource configurations. Similarly, if there are 100 resource configurations, then there may be 100 stacked target source parameter vectors forming the target parameter matrix.

Parameter data extractor 116 can generally use the datasets, such as the matrices, generated by parameter dataset generator 114, to extract feature vectors for determining target parameter data.

After obtaining the source parameter dataset and the target parameter dataset (e.g, the reward matrices, source parameter matrix and target parameter matrix) for both source domain and target domain, d-dimensional pseudo service feature vectors $\{\dot{\theta}_i^S\}_{i=1}^{N_S}$, $\{\dot{\theta}_i^T\}_{i=1}^{N_T}$ and the d-dimensional configuration feature vectors $\{x_j^S\}_{j=1}^{K_S}$, $\{x_j^T\}_{j=1}^{K_T}$ are extracted. Extraction can be done using machine learning techniques, such as unsupervised machine learning techniques. An example of a suitable technique for extracting the pseudo service feature vectors and the d-dimensional configuration feature vectors uses SVD.

Parameter data extractor 116 further clusters the source domain (e.g., CPU data domain). To construct the clustering structure in the source domain, the source domain pseudo service feature vectors $\{\dot{\theta}_i^S\}_{i=1}^{N_S}$ are clustered by k-means to obtain C clustering centroids $\tilde{\Theta}_{O \times d}^S = \{\tilde{\theta}_k^S\}_{k=1}^C$ as the source domain clustering representations.

Parameter data extractor 116 determines true domain translation matrix U* and true clustering weights in the target domain. To derive the true domain translation matrix U* and the true clustering weights in the target domain $\{w_{i,k}^*\}_{i=1,k=1}^{N_T,C}$, the target parameter matrix is regressed on U* and $w_{i,k}^*$ given the target configuration feature vectors. Then, the true service feature vectors, as the target parameter reward dataset, are derived as $\theta_i^* = \Sigma_{k=1}^C w_{i,k}^* U^* \tilde{\theta}_k^S$, i=1, 2, ..., $N_T$.

Having determined the true service feature vectors of the target parameter reward dataset, optimal resource configuration determiner 118 can be employed to determine the target parameter (e.g., the number of GPU) for a cloud service resource (e.g., GPUs) in a resource configuration.

To do so, optimal resource configuration determiner 118 can be configured to approach the cross-domain resource allocation problem as a transfer learning clustering of bandits problem, and solve the problem using the information derived from parameter dataset generator 114 and parameter data extractor 116. Since the source domain and the target domain may have different tasks, the arm sets in two domains are assumed to be completely different and there are no overlapped services between the two domains. It is assumed that there is rich interaction data in the source domain and the clustering characteristics $\{\tilde{\theta}_k^S\}_{k=1}^C$ can be extracted offline.

In the online decision making process, the algorithm approximates a domain transfer matrix U, which transfers the clustering centroids to the target domain. For each service in the target domain, the algorithm learns a set soft assignment parameters $\{w_{i,k}\}_{i=1, k=1}^{N_T,C}$ to determine in which clusters the service belongs.

At each time step t, the a batch of previous interactions $b_t$ is sampled in a memory buffer B, which is then used to update the transfer matrix U and the soft assignment parameters $\{w_{i,k}\}_{i=1, k=1}^{N_T,C}$ corresponding to the services by the loss function:

$$L = \sum_{i \in b_t} \left( r_{i,t} - \sum_{k=1}^C w_{i,k} (x_j^T)^T U \tilde{\theta}_k^S \right)^2. \quad (2)$$

For each incoming service, optimal resource configuration determiner 118 determines the optimal resource configuration by selecting the arm with the highest predicted reward. The arm having the highest predicted reward can be determined using the following example:

$$j_t = \arg \max_{1 \leq j \leq K_T} (1-\epsilon) \sum_{k=1}^C w_{i,k} (x_j^T)^T U \tilde{\theta}_k^S + \epsilon \mathcal{N}, \quad (3)$$

Here, the uncertainty is modeled by a random walk process $\mathcal{N}$ to promote exploration. The arm with the highest predicted reward comprises the target parameter, e.g., the optimal parameter value for the corresponding cloud service resource to be provided to client computing device 104. For example, the optimal arm, e.g., that having the highest predicted reward, includes the target parameter.

Figure 4:
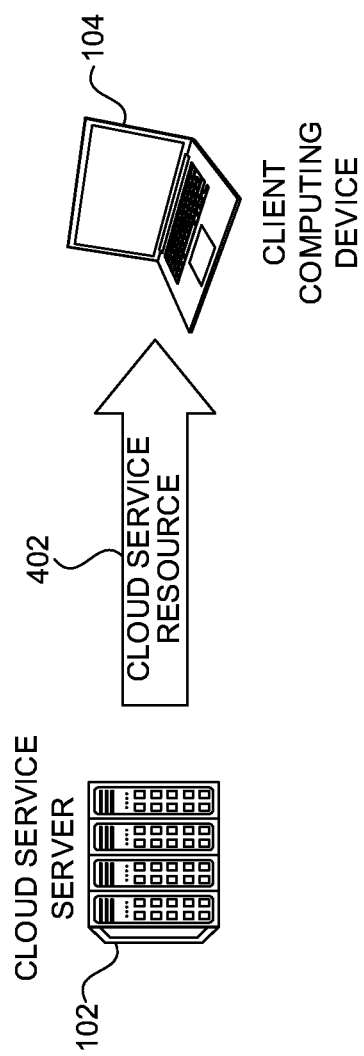
FIG. 4 illustrates an example cloud service resource server providing cloud service resources to a client computing device, in accordance with an aspect described herein.

Based on determining the target parameter for allocating a cloud service resource, cloud service resource provider 120 provides the cloud service resource corresponding to the target parameter. That is, cloud service resource provider 120 may allocate the optimal amount of the cloud service resource to client computing device 104 for use by client computing device 104. In an aspect, the provided cloud service resource comprises GPU. FIG. 4 provides an example illustration of cloud service resource provider 120 providing cloud service resource 402 from cloud service server 102 to client computing device 104.

Figure 5:
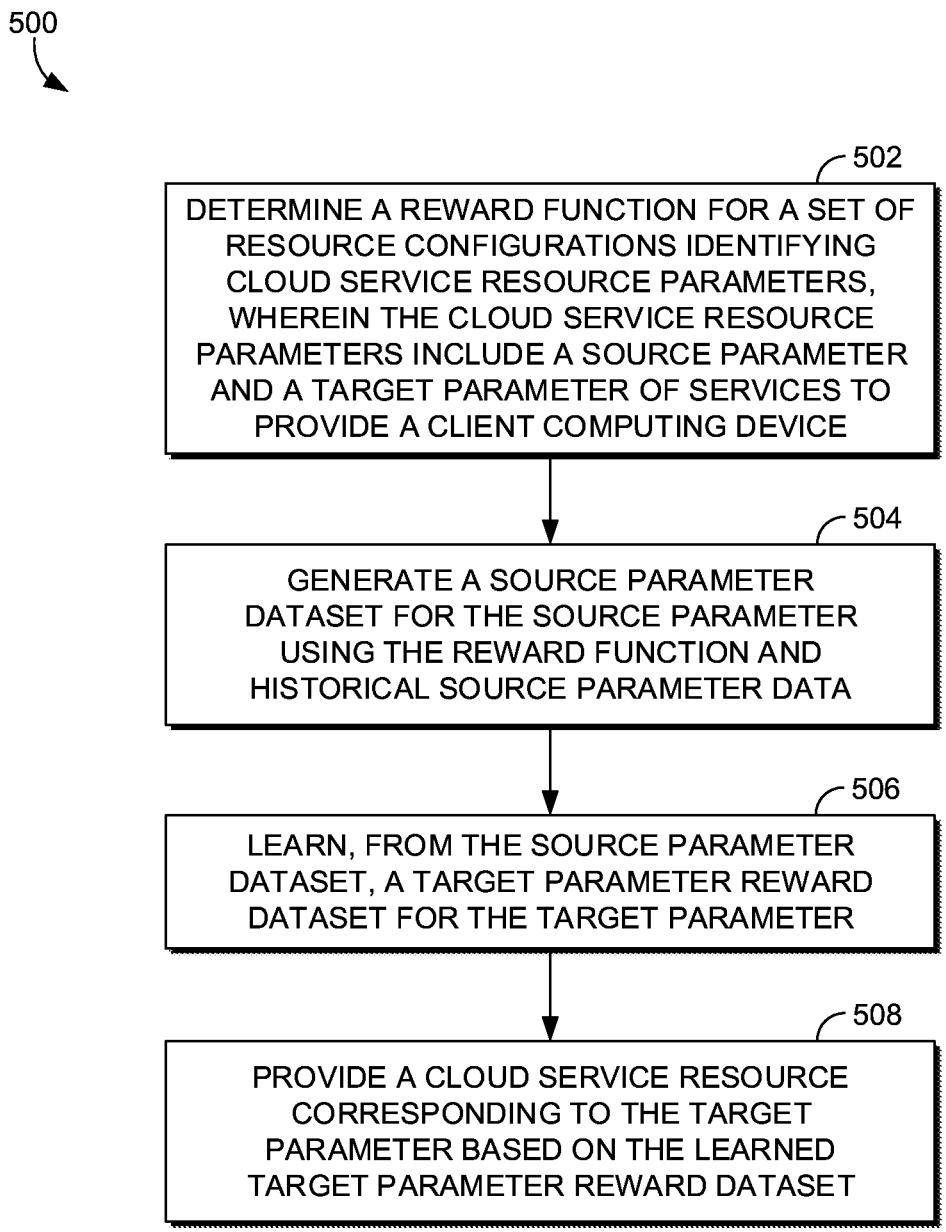
FIG. 5 illustrates a block diagram of an example method for allocating cloud service resources, in accordance with an aspect described herein.

With reference now to FIG. 5, a block diagram is provided to illustrate an example method 500 of allocating cloud service resources. Each block of method 500 may comprise a computing process performed using any combination of hardware, firmware, or software. For instance, various functions can be carried out by a processor executing instructions stored in memory. The method can also be embodied as computer-usable instructions stored on computer storage media. The method can be provided by a standalone application, a service or hosted service (standalone or in combination with another hosted service), or a plug-in to another product, to name a few possibilities. Method 500 may be implemented in whole or in part by components of operating environment 100.

At block 502, a reward function is determined. For instance, this may be determined using reward determiner 112. In an aspect of the technology, a previously determined and stored reward function is accessed. The reward function describes a set of resource configurations that identify cloud service resource parameters for cloud service resources that can be provided, e.g., allocated to, a client computing device. A source parameter and a target parameter are resource parameters that are included in resource configurations of the set. In one aspect of the technology, the source parameter corresponds to a number of CPUs to provide to the client device, while the target parameter corresponds to a number of GPUs to provide to the client device within a resource configuration. The optimal target parameter can be learned from historical source parameter data corresponding to the source cloud service resource.

At block 504, a source parameter dataset is generated. In aspects, a target parameter dataset may also be generated. This may be done by parameter dataset generator 114. For instance, parameter dataset generator 114 may apply historical source parameter data 122 to the reward function determined or accessed at block 502 to derive the source parameter dataset and the target parameter. In an aspect, the source parameter dataset is a source parameter matrix that comprises source parameter vectors determined for the resource configurations in the set of resource configurations using the reward function. In an aspect, the target parameter dataset is a target parameter matrix that comprises target source parameter vectors determined for the resource configurations in the set of resource configurations using the reward function.

At block 506, a target parameter reward dataset is learned from at least the source parameter dataset. Parameter data extractor 116 can be employed to learn the target parameter reward dataset. In doing so, a machine learning model may be used to learn from the source parameter dataset. The machine learning model may be an unsupervised machine learning model, such as SVD. The result of the SVD may be clustered to identify a set of pseudo service feature vectors in the source domain, resulting from the machine learning, that correspond to the source parameter. The clustering determines clustering centroids as source domain clustering representations. Using the data determined at block 504 and block 506, a target parameter reward dataset is determined. Optimal resource configuration determiner 118 can utilize the target parameter reward dataset to identify an optimal configuration. The optimal configuration includes a source parameter and a target parameter that can be identified as the optimal parameters.

At block 508, cloud service resources are provided to a client computing device. The provided cloud service resources correspond to the target parameter. The cloud service resource is allocated in an amount corresponding to the target parameter identified from the optimal configuration.

Figure 6:
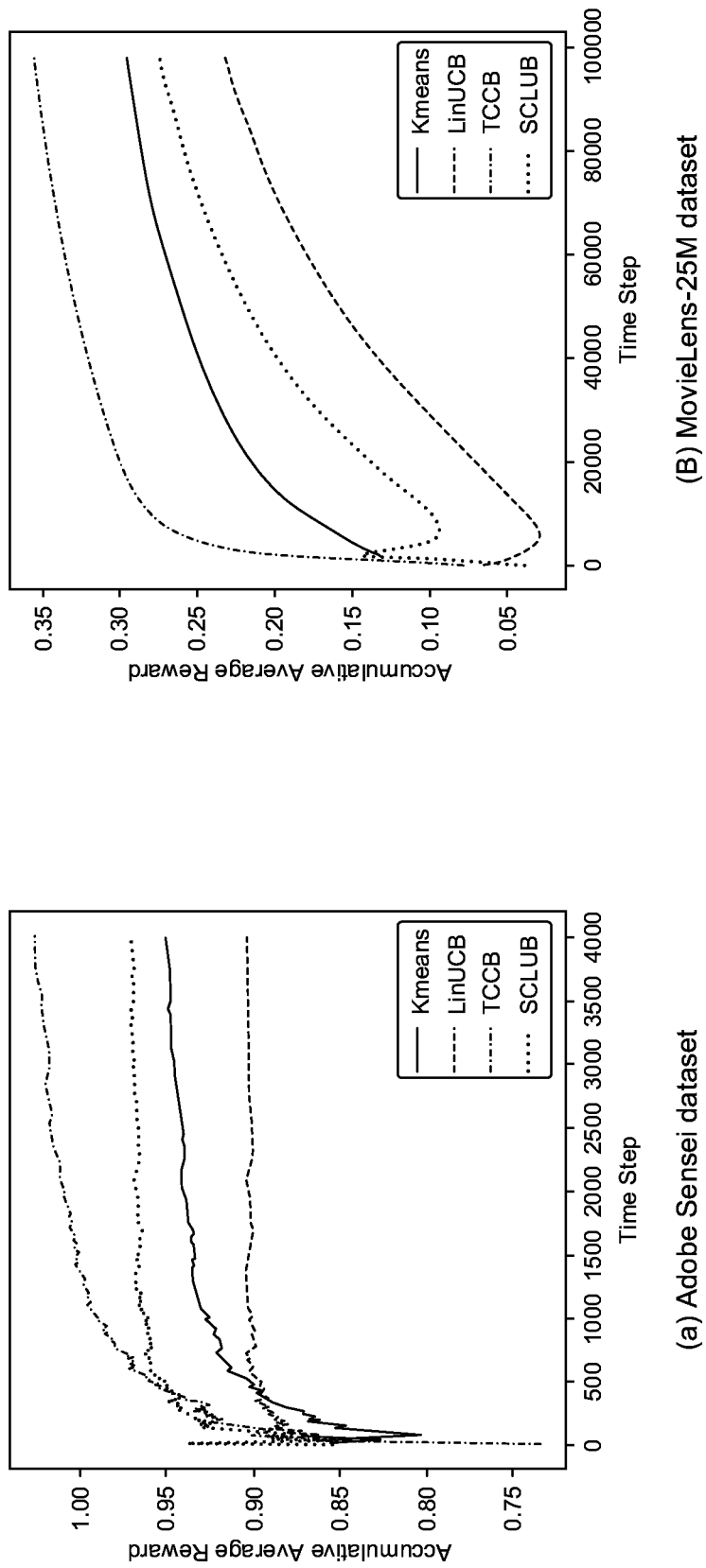
FIG. 6 illustrates an example of the technology as implemented on datasets, in accordance with an aspect described herein.

Turning to FIG. 6, FIG. 6 illustrates the results of experiments performed on two different datasets. At each experiment, the described technology, illustrated as "TCCB," determined a higher average reward than other methods, thus identifying a more optimal resource configuration relative to the other models. By identifying a more optimal resource, a more optimal target parameter is determined.

In this example, for each time step, TCCB determines the projection between the source domain and target domain. Then TCCB will determines the clustering of the current model. Based on the clustering weights, TCCB predicts the best configuration. After obtaining the reward from the current model corresponding to the assign configuration, the domain projection and clustering is updated. With the method trained online, the prediction of the best configuration is becoming more accurate with an increasing averaged cumulative reward.

For Movie-Lens, each round, the system clusters the movies in the target domain according to the domain projection and determines the characteristics of these movies. With a user coming to interact with the system, the system will pick a movie that is predicted to be the user's favorite. By obtaining the user's actual feedback, the system updates the projection and the clustering to correct its prediction.

Figure 7:
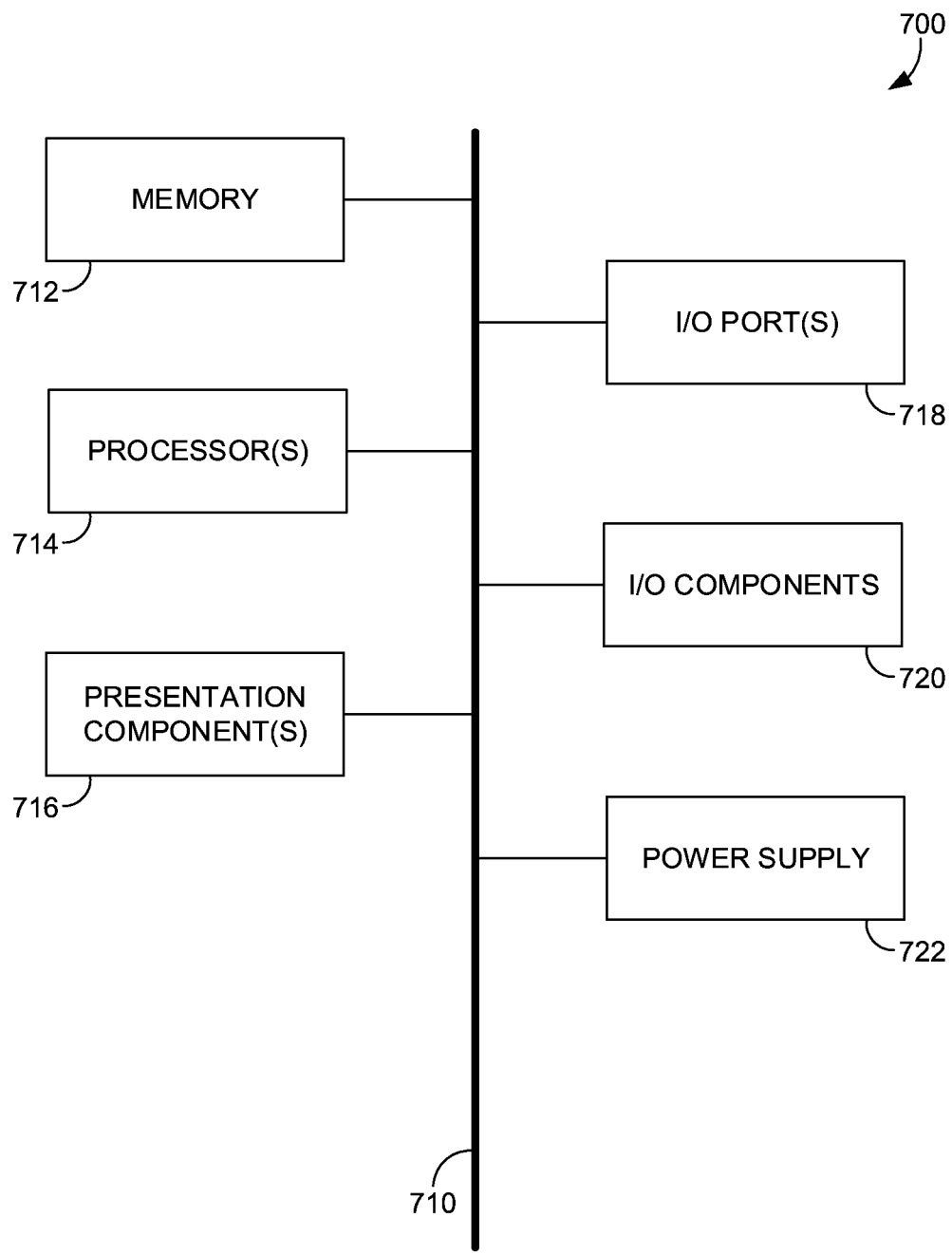
FIG. 7 illustrates an example computing device in which aspects of the technology may be employed, in accordance with an aspect described herein.

Having described an overview of some embodiments of the present technology, an example computing environment in which embodiments of the present technology may be implemented is described below in order to provide a general context for various aspects of the present technology. Referring now to FIG. 7, in particular, an example operating environment for implementing embodiments of the present technology is shown and designated generally as computing device 700. Computing device 700 is but one example of a suitable computing environment and is not intended to suggest any limitation as to the scope of use or functionality of the technology. Computing device 700 should not be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 7, computing device 700 includes bus 710, which directly or indirectly couples the following devices: memory 712, one or more processors 714, one or more presentation components 716, input/output (I/O) ports 718, input/output components 720, and illustrative power supply 722. Bus 710 represents what may be one or more buses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 7 is merely illustrative of an example computing device that can be used in connection with one or more embodiments of the present technology. Distinction is not made between such categories as "workstation," "server," "laptop," "hand-held device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media, also referred to as a communication component, includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and that can be accessed by computing device 700. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 712 includes computer-storage media in the form of volatile or nonvolatile memory. The memory may be removable, non-removable, or a combination thereof. Example hardware devices include solid-state memory, hard drives, optical-disc drives, etc. Computing device 700 includes one or more processors that read data from various entities, such as memory 712 or I/O components 720. Presentation component(s) 716 presents data indications to a user or other device. Example presentation components include a display device, speaker, printing component, vibrating component, etc.

I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition, both on screen and adjacent to the screen, as well as air gestures, head and eye tracking, or touch recognition associated with a display of computing device 700. Computing device 700 may be equipped with depth cameras, such as stereoscopic camera systems, infrared camera systems, RGB (red-green-blue) camera systems, touchscreen technology, or other like system, or combinations of these, for gesture detection and recognition. Additionally, the computing device 700 may be equipped with accelerometers or gyroscopes that enable detection of motion. The output of the accelerometers or gyroscopes may be provided to the display of computing device 700 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low-level software written in machine code; higher level software, such as application software; and any combination thereof. In this regard, components for allocating cloud service resources can manage resources and provide the described functionality. Any other variations and combinations thereof are contemplated within embodiments of the present technology.

With reference briefly back to FIG. 1, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to cloud service engine 110, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as database 106. Moreover, functions of cloud service engine 110, among other functions, may be performed by cloud service server 102, client computing device 104, or any other component, in any combination.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including," "having," and other like words and their derivatives have the same broad meaning as the word "comprising," and the word "accessing" comprises "receiving," "referencing," or "retrieving," or derivatives thereof. Further, the word "communicating" has the same broad meaning as the word "receiving," or "transmitting," as facilitated by software or hardware-based buses, receivers, or transmitters" using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment. However, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated by the accompanying drawings is to be interpreted as illustrative and not in a limiting sense.

Some example aspects that can be practiced from the forgoing description include the following:

Aspect 1: A system for cloud service resource allocation, the system comprising: at least one processor; and one or more computer storage media storing computer readable instructions thereon that when executed by the at least one processor cause the at least one processor to perform operations comprising: determining a reward function for a set of resource configurations identifying cloud service resource parameters, wherein the cloud service resource parameters include a source parameter and a target parameter of services to provide a client computing device; generating a source parameter dataset for the source parameter using the reward function and historical source parameter data; learning, from the source parameter dataset, a target parameter reward dataset for the target parameter; and providing a cloud service resource corresponding to the target parameter derived from the target parameter reward dataset.

Aspect 2: A method performed by one or more processors for cloud service resource allocation, the method comprising: generating a source parameter dataset for a source parameter using a reward function and historical source parameter data, the reward function corresponding to a set of resource configurations that identify cloud service resource parameters, wherein the cloud service resource parameters include the source parameter and a target parameter of services to provide a client computing device; learning, from the source parameter dataset, a target parameter reward dataset for the target parameter; and providing a cloud service resource corresponding to the target parameter derived from the target parameter reward dataset.

Aspect 3: One or more computer storage media storing computer readable instructions thereon that, when executed by a processor, cause the processor to perform a method for cloud service resource allocation, the method comprising: accessing a source parameter dataset for a source parameter using a reward function and historical source parameter data, the reward function corresponding to a set of resource configurations that identify cloud service resource parameters, wherein the cloud service resource parameters include the source parameter and a target parameter of services to provide a client computing device; learning, from the source parameter dataset, a target parameter reward dataset for the target parameter; and providing a cloud service resource corresponding to the target parameter derived from the target parameter reward dataset.

Aspect 4: Any of Aspects 1-3, wherein the source parameter dataset is a source parameter matrix that comprises source parameter vectors determined for the resource configurations in the set of resource configurations using the reward function.

Aspect 5: Any of Aspects 1-4, wherein the learning operation comprises employing a machine learning technique on the source parameter dataset.

Aspect 6: Aspect 5, wherein the machine learning technique is singular value decomposition (SVD).

Aspect 7: Any of Aspects 1-6, further comprising clustering a set of pseudo service feature vectors in a source domain corresponding to the source parameter to determine clustering centroids as source domain clustering representations.

Aspect 8: Any of Aspects 1-7, wherein the source parameter is a central processing unit (CPU).

Aspect 9: Any of Aspects 1-8, wherein the target parameter is a graphics processing unit (GPU).

What is claimed is:

1. A system for cloud service resource allocation, the system comprising:
   at least one processor; and
   one or more computer storage media storing computer readable instructions thereon that when executed by the at least one processor cause the at least one processor to perform operations comprising:
   determining a reward function for a set of resource configurations identifying cloud service resource parameters, wherein the cloud service resource parameters include a source parameter and a target parameter of services to provide a client computing device;
   generating a source parameter dataset for the source parameter using the reward function and historical source parameter data, the source parameter dataset corresponding to a source domain;
   learning, from the source parameter dataset, a target parameter reward dataset for the target parameter, the target parameter reward dataset corresponding to a target domain different from the source domain, and each of the source domain and the target domain corresponding to different resource device types, whereby knowledge is transferred from the source domain to the different target domain by the learning; and
   providing a cloud service resource corresponding to the target parameter derived from the target parameter reward dataset.

2. The system of claim 1, wherein the source parameter dataset is a source parameter matrix that comprises source parameter vectors determined for the resource configurations in the set of resource configurations using the reward function.

3. The system of claim 1, wherein the learning operation comprises employing a machine learning technique on the source parameter dataset.

4. The system of claim 3, wherein the machine learning technique is singular value decomposition (SVD).

5. The system of claim 1, further comprising clustering a set of pseudo service feature vectors in the source domain corresponding to the source parameter to determine clustering centroids as source domain clustering representations.

6. The system of claim 1, wherein the source parameter is a central processing unit (CPU).

7. The system of claim 1, wherein the target parameter is a graphics processing unit (GPU).

8. A method performed by one or more processors for cloud service resource allocation, the method comprising:
   generating a source parameter dataset for a source parameter using a reward function and historical source parameter data, the reward function corresponding to a set of resource configurations that identify cloud service resource parameters, wherein the cloud service resource parameters include the source parameter and a target parameter of services to provide a client computing device;
   learning, from the source parameter dataset, a target parameter reward dataset for the target parameter, the source parameter dataset corresponding to a source domain and the target parameter reward dataset corresponding to a target domain different from the source domain, and each of the source domain and the target domain corresponding to different resource device types, whereby knowledge is transferred from the source domain to the different target domain by the learning; and
   providing a cloud service resource corresponding to the target parameter derived from the target parameter reward dataset.

9. The method of claim 8, wherein the source parameter dataset is a source parameter matrix that comprises source parameter vectors determined for the resource configurations in the set of resource configurations using the reward function.

10. The method of claim 8, wherein the learning comprises employing a machine learning technique on the source parameter dataset.

11. The method of claim 10, wherein the machine learning technique is singular value decomposition (SVD).

12. The method of claim 8, further comprising clustering a set of pseudo service feature vectors in the source domain corresponding to the source parameter to determine clustering centroids as source domain clustering representations.

13. The method of claim 8, wherein the source parameter is a central processing unit (CPU).

14. The method of claim 8, wherein the target parameter is a graphics processing unit (GPU).

15. One or more computer storage media storing computer readable instructions thereon that, when executed by a processor, cause the processor to perform a method for cloud service resource allocation, the method comprising:
   accessing a source parameter dataset for a source parameter using a reward function and historical source parameter data, the reward function corresponding to a set of resource configurations that identify cloud service resource parameters, wherein the cloud service resource parameters include the source parameter and a target parameter of services to provide a client computing device;
   learning, from the source parameter dataset, a target parameter reward dataset for the target parameter, the source parameter dataset corresponding to a source domain and the target parameter reward dataset corresponding to a target domain different from the source domain, and each of the source domain and the target domain corresponding to different resource device types, whereby knowledge is transferred from the source domain to the different target domain by the learning; and
   providing a cloud service resource corresponding to the target parameter derived from the target parameter reward dataset.

16. The media of claim 15, wherein the source parameter dataset is a source parameter matrix that comprises source parameter vectors determined for the resource configurations in the set of resource configurations using the reward function.

17. The media of claim 15, wherein the learning comprises employing a machine learning technique on the source parameter dataset.

18. The media of claim 17, wherein the machine learning technique is singular value decomposition (SVD).

19. The media of claim 15, further comprising clustering a set of pseudo service feature vectors in the source domain corresponding to the source parameter to determine clustering centroids as source domain clustering representations.

20. The media of claim 15, wherein the source parameter is a central processing unit (CPU), and the target parameter is a graphics processing unit (GPU).

* * * * *